United States Patent [19]
Harte

[11] 3,949,491
[45] Apr. 13, 1976

[54] MATHEMATICAL TEACHING AID

[76] Inventor: James Richard Harte, 10 W. Concord, Kansas City, Mo. 64112

[22] Filed: Oct. 11, 1973

[21] Appl. No.: 405,473

[52] U.S. Cl............................................. 35/31 R
[51] Int. Cl.².................................... G09B 19/02
[58] Field of Search ...... 35/31 R, 31 B, 31 D, 31 E, 35/31 F, 32; 33/107 R, 107 CB, 111, 108; 177/246, 252

[56] References Cited
UNITED STATES PATENTS

| | | | |
|---|---|---|---|
| 230,619 | 8/1880 | Darling | 33/107 R |
| 1,273,086 | 7/1918 | Newell | 33/107 R |
| 1,595,422 | 8/1926 | Rose | 33/111 |
| 2,494,469 | 1/1950 | Booth | 35/31 D |
| 3,212,202 | 10/1965 | Heinichen | 35/31 R |
| 3,353,284 | 11/1967 | Hursh et al. | 35/31 F |
| 3,526,045 | 9/1970 | Stone | 35/31 B |

FOREIGN PATENTS OR APPLICATIONS

| | | | |
|---|---|---|---|
| 18,813 | 5/1894 | United Kingdom | 33/107 R |
| 23,247 | 7/1892 | United Kingdom | 33/107 R |
| 482,074 | 6/1953 | Italy | 33/107 R |

Primary Examiner—Wm. H. Grieb
Attorney, Agent, or Firm—D. A. N. Chase

[57] ABSTRACT

This invention relates to a mathematical teaching aid comprising a beam which has two parallel longitudinal upper faces each face being divided up by equally spaced marks representing numbers, the numbers on one face progressing from 0 at one end to *n* at the other end of the beam face, the numbers on the other face progressing from 0 at the mid-point of the face to *n*/2 at one end and −(*n*/2) at the other end of the beam face.

6 Claims, 22 Drawing Figures

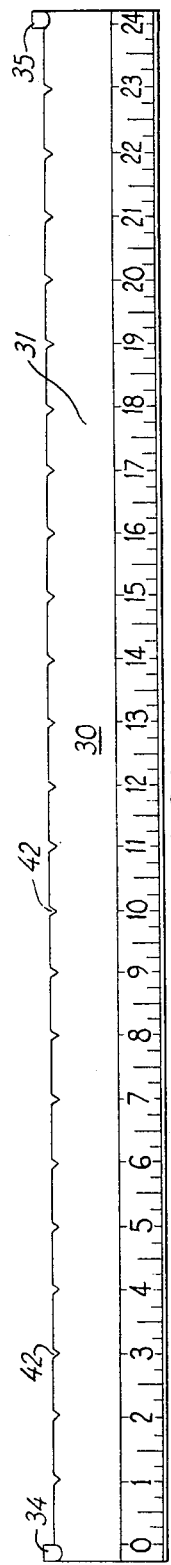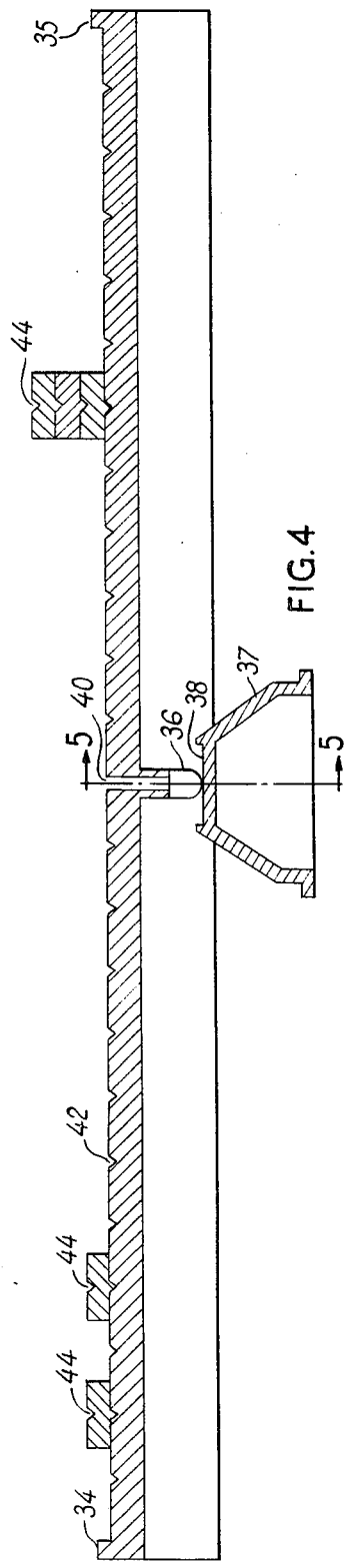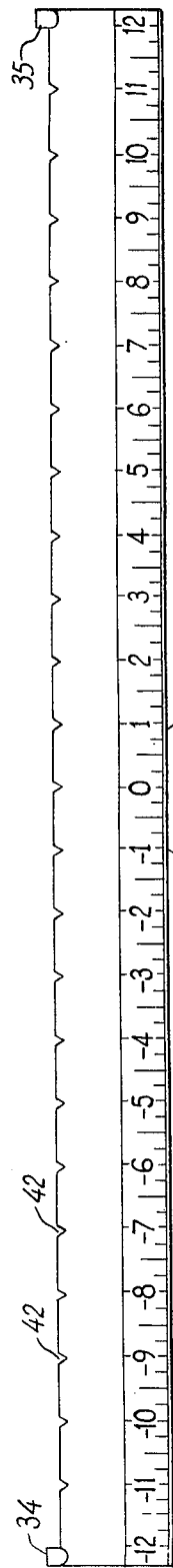

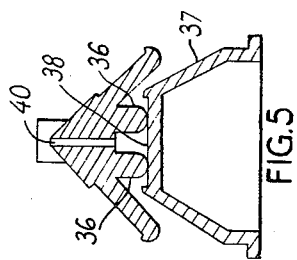
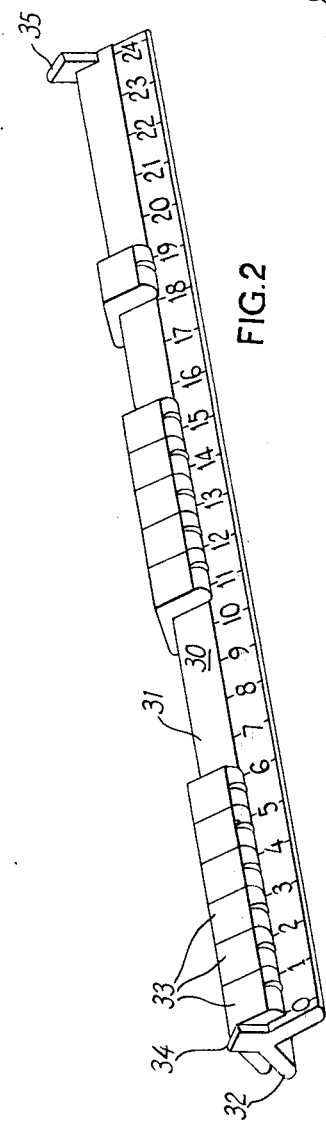
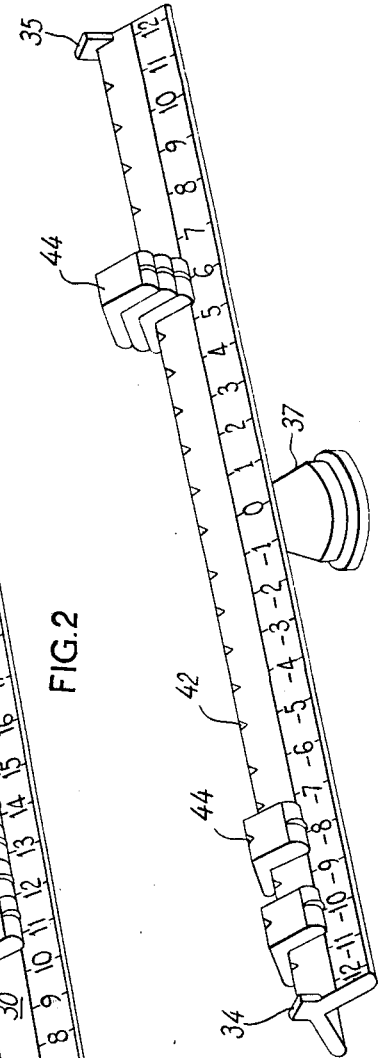
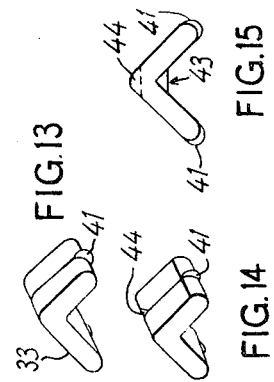
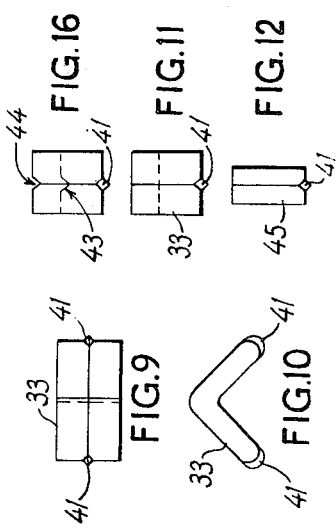

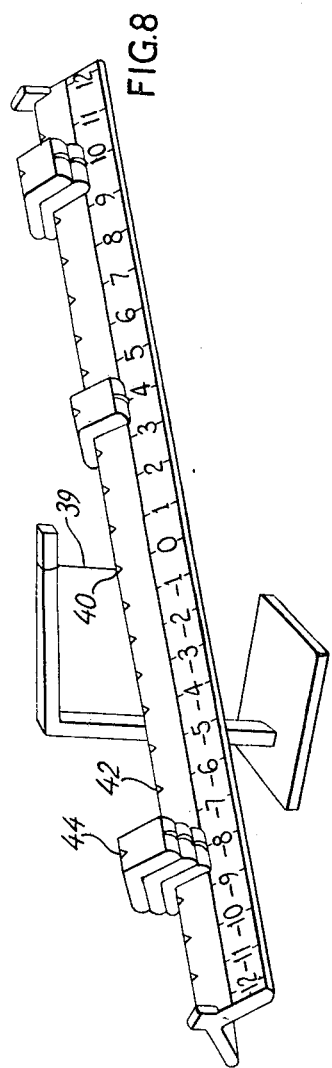
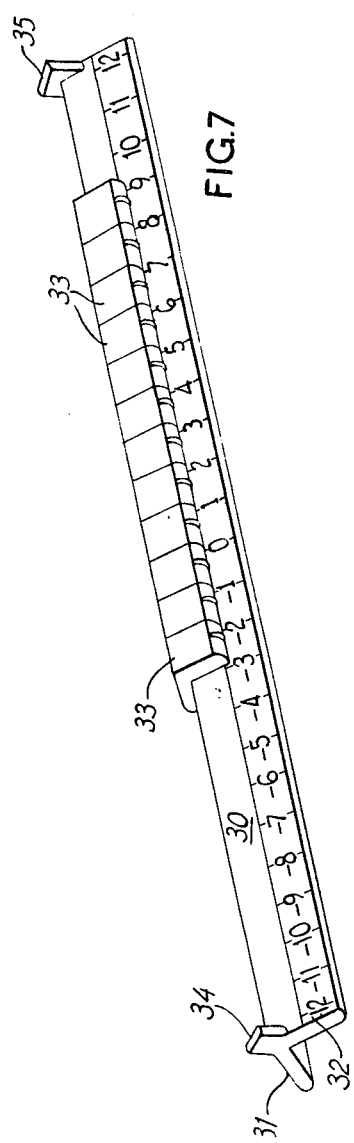

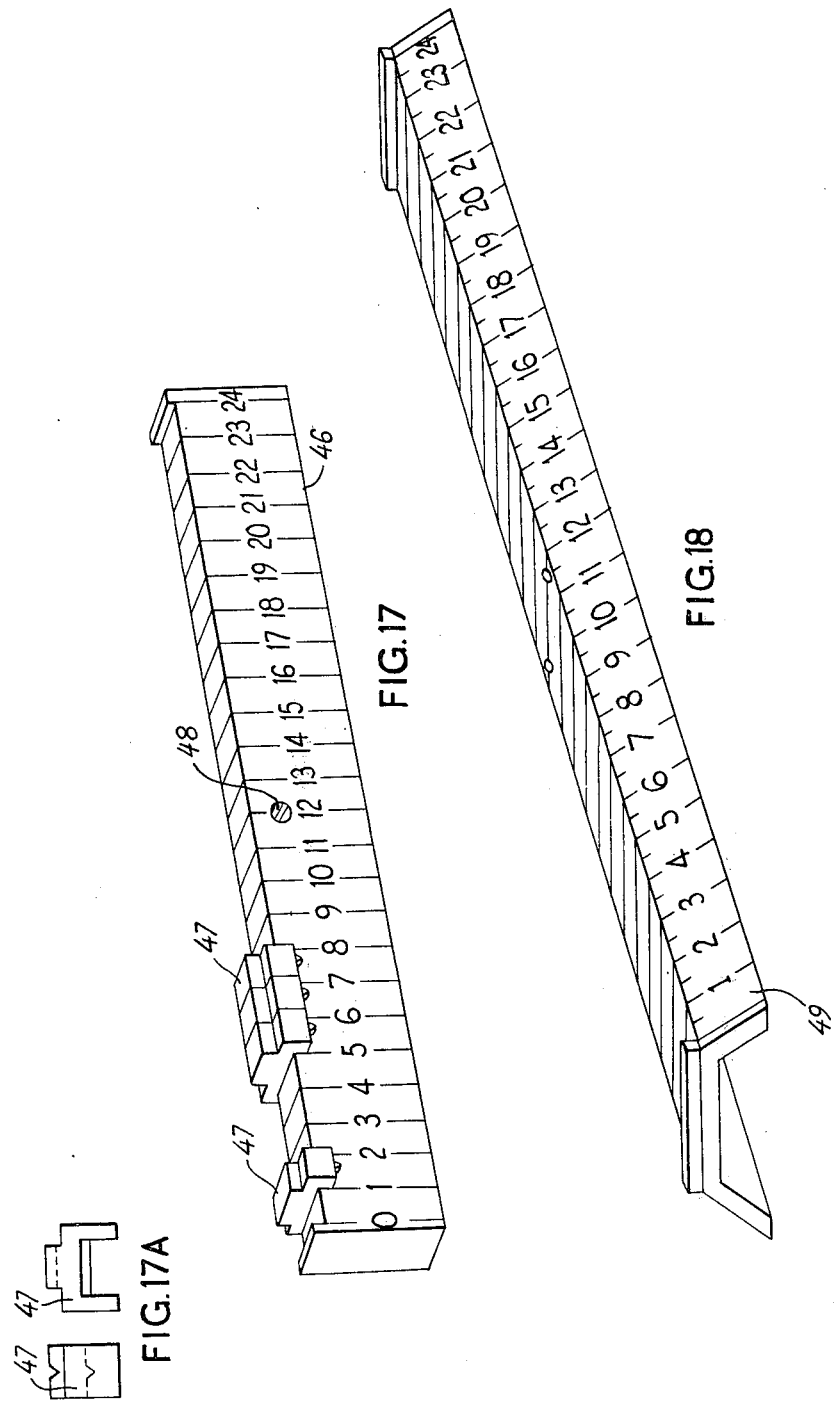

MATHEMATICAL TEACHING AID

This invention relates to a mathematical teaching aid. The aid is designed to allow the student to experience mathematical relationships between numbers by the student's physical manipulation of the materials. The mathematical aid is designed so that with a simple piece of equipment containing a number of parts, the student can gain an understanding of the numerical relationships involved in addition, subtraction, multiplication, and division of whole numbers and fractions.

According to the invention, a mathematical teaching aid comprises a beam which has two parallel longitudinal upper faces, each face being divided up by equally spaced marks representing numbers, the numbers on one face progressing from 0 at one end to $n$ at the other end of the beam face, the numbers on the other face progressing from 0 at the mid-point of the face to $n/2$ at one end of the beam face and $-(n/2)$ at the other end of the beam face.

The beam may, for example, be curved, semi-circular, rectangular or trapezoidal in cross-section;

In one form, the mathematical aid allows the student to experience equations in a simple numerical form by means of a centrally located point that balances the right and left arm of a beam when the mathematical aid serves as a balance. The mid-point of the beam can balance by means of balancing points (or a single point) when the balancing point rests on a pedestal. Or the centrally located balancing point can be a hole, through which a string is run, the upper part of the string then being suspended by a frame or holder, or the upper part of the string being held by hand.

In the accompanying drawings:

FIG. 1 is a side elevation of a beam for use in a mathematical aid embodying the invention;

FIG. 2 is an isometric view of the same beam with units on it illustrating use of the beam as a simple number line;

FIG. 3 is a side elevation of the same beam used as a balance by mounting the beam pivotally on a pedestal, the opposite face of the beam shown in this view to illustrate the numbering system in full;

FIG. 4 is a longitudinal section through the beam and pedestal of FIG. 3 and shows units mounted on the beam;

FIG. 5 is a section on the line 5—5 shown in FIG. 4;

FIG. 6 shows the same beam isometrically;

FIG. 7 is an isometric drawing of a beam being used for a simple subtraction sum;

FIG. 8 shows a different way of using the beam as a balance;

FIG. 9 is a top plan view of an unnotched unit;

FIG. 10 is an end view of an unnotched unit;

FIG. 11 is a side view of an unnotched unit;

FIG. 12 is a side view of a half unit;

FIG. 13 is an isometric view of an unnotched unit;

FIG. 14 is an isometric view of a notched unit;

FIG. 15 is an end view of a notched unit;

FIG. 16 is a side view of a notched unit;

FIG. 17 is an isometric view of another beam embodying the invention, this beam being rectangular in cross-section;

FIG. 17A shows cross-section through unit for use with this beam (FIG. 17).

FIG. 18 is an isometric view of another beam which is trapezoidal in cross-section;

Figure 19:
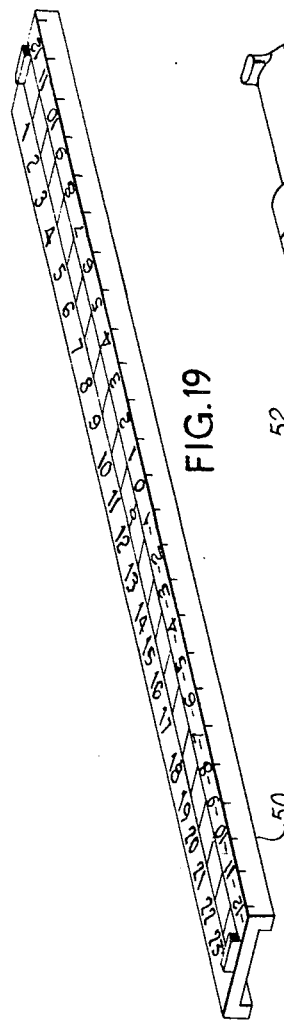
FIG. 19 is an isometric view of another beam of rectangular or inverted U-shape in cross-section.

This mathematical aid can be used in the following ways:

1. To teach numerical sequences, and simple addition and subtraction as illustrated in FIGS. 1 and 2. Numerals extend from left to right in single step increments from 0 to 24 in FIGS. 1 and 2.

FIG. 1 illustrates one face 31 of the beam 30 of the mathematical aid, with a number line starting at 0 on the left and extending to number 24 on the right. FIG. 2 illustrates the use of the beam 30 of the mathematical aid as a number line by positioning single unnotched units 33 (FIGS. 9, 10, 11, and 13) on its upper surface. It will be noted that the beam 30 has two longitudinal faces 31 and 32 set at an angle so as to form, in cross-section, an inverted "V." These unnotched units 33 can be pushed freely back and forth on the upper surface of the beam 30. The width of one unit corresponds to the distance between one number and the next number on the number line of the beam 30. Elevated stops 34 and 35 at each end of the beam extend upward from the end of the beam 30 to limit the movement of the units 33 so they cannot be pushed past 0 or 24 in the number line 0 to 24. As additional units 33 (as in FIG. 2) are placed on the beam 30 and pushed to the left line intersecting the number on the beam 30 that is below the right hand edge of the last unit on the right indicates the total number of units added, and pushed to the left. For subtraction, the larger number is placed on the beam 30, and all units 33 are pushed to the left until the one on the far left hits the stop 34. The number of units to be subtracted are then removed. The remaining units are pushed to the left, and the number below the right edge of the last unit on the right indicates how many units remain.

2. Another means by which subtraction can be carried out is illustrated in FIGS. 2 and 7. Twelve units 33 are positioned on the top of the beam — when all the units on FIG. 2 are pushed to the left a 12 is indicated below the right hand edge of the last unit on the right on the 0–24 number line on its face 31. The beam is then turned 180° on a horizontal plane to reveal a number line of $-12$ to $+12$ on its face 32. The group of units is then pushed to the right along the rail (upper surface) until the number to be subtracted is represented as a minus number (e.g. $-3$ illustrated in FIG. 7) below the left hand edge of the left hand unit of the cluster of units. The number below the right hand edge of the last unit on the right then represents the answer — e.g., 9, or $12 - 3 = 9$.

3. Addition, subtraction, multiplication and division can also be experienced by using the beam or rail as a balance beam, with arms extending to the right and left of the central balancing point "0." This central balancing point is illustrated in FIGS. 3, 4, 5, 6, and 8. FIGS. 3, 4, 5, and 6 illustrate the use of a balancing point comprising one or more solid projections 36 pivoting on a pedestal 37 with a flat upper surface 38. FIG. 8 illustrates the use of a string 39 in a centrally located hole 40 to provide the pivotal or balancing means. (FIGS. 4 and 5 also illustrate the centrally located hole 40.)

When used with the balancing means, lips 41 extending from the centre of the lower edges of the units (FIGS. 9 to 16) are to be placed so that the central indicating lips coincide with the number to be indicated. Unnotched units (FIGS. 9 to 13) may be used for this purpose. However, to accurately position the units, and to prevent the units from sliding down the beam when it tilts, notched units (FIGS. 14 to 16) are preferred.

Unnotched units are illustrated in FIGS. 2, 7, 9, 10, 11, 12, and 13. Unnotched units can be used when the beam is used as a number line.

Notched units are illustrated in FIGS. 4, 6, 8, 14, 15, and 16.

Notches 42 in the ridge of the beam correspond with the underlying number. Wedges 43 centrally located under the notched units fit into the notches 42 in the ridge of the beam, or fit into the notch 44 of an underlying notched unit when several are placed one on top of another as illustrated in FIGS. 4, 6 and 8.

FIGS. 4 and 6 illustrate that $10 + 8 = 6 + 6 + 6$, or $3 \times 6 = 18$. The beam will be in a balanced position when this occurs. Removal of one unit will result in a disequilibrium and one arm will fall and the other will elevate. The units on the other arm will have to be realigned, or one unit removed and the others realigned to again obtain a balance. When a balance is obtained the sum of the moments on one arm should equal the sum of the moments on the other arm. In this manner simple addition, subtraction, multiplication and division can be taught in equation form.

FIG. 12 represents a half unit 45 in width and weight.

4. With this mathematical aid fractions can be taught in two ways. One way is by the use of fractional units as in FIG. 12. Another way to teach fractions would be to have the central lower lip of unnotched units intersecting with one of the fractional lines on the sides of the rail of the mathematical aid. This could be done by illustrating that $2 \times 2\frac{1}{2} = 5$ — e.g., 2 units one on top of the other, positioned at 2½ will balance one unit of the same weight when it is placed at 5 on the other arm. In a like manner it could be shown that $4 \times 1\frac{1}{4} = 6$, etc.

Combinations of fractions on the number line, and fractional units illustrated in FIG. 12 could also be used. Division can be illustrated in two ways. The first way is by dividing a number of stacked units by a whole number that will evenly go into it, or that will produce a fraction that can be represented in fractional unit form.

Thus if $3 \times 6 = 10 + 8$
½ of $3 \times 6$ could be illustrated as
$1\frac{1}{2} \times 6 =$ not $10 + 8$, but 9

Thus 1½ units in the 6 position would be found to produce a moment of 9, and would balance with 9 on the other arm.

The second way of division is by movement of the units to different position.

Thus $3 \times 6 = 10 + 8$

½ of $3 \times 6$ could be illustrated by moving the stack of 3 units to the 3 position on the beam. This would be $3 \times 3$ which would produce a moment of 9, and one unit at 9 on the opposite arm should cause the beam to balance.

Thus, to summarize, the beam may be used as a simple number line in which case, on one side of the beam numerals are located at definite intervals ranging from 0 on the left to a given higher number on the right; on the other side of the beam 0 is at the mid-point in the beam; negative numbers start at the mid-point and continue set unit intervals to the far left; and positive numbers start at the mid-point and continue at set intervals to the far right. The unit intervals are of the same distance or length for both number lines (e.g., 0 to 24, and $-12$ to $+12$ as illustrated). The beam or rail is so constructed that the "0" that is at the mid-point on one face coincides with a whole number (e.g., 12) that is centrally located in the series of numbers on the other face of the beam. The beam or rail is to be used in conjunction with units that can be pushed back and forth on the upper surface of the beam or rail. These units are of the same length as the intervals of the number line, or are multiples or fractions of these lengths. Units of the same length are also of the same weight. Stops are used at both ends of the beam to prevent the units from being pushed off the beam or number line, and also to position the units so that the edges of the units align exactly with the interval markings on the beam when units are pushed individually or in groups to the far left or for right. The units are so constructed that gravitational force and the structural design of the unit keeps them in position on top of the beam. Thus, until lifted off the beam the units are captured on its upper surface by stops at both ends and by the configuration of the units that cause them to track on the upper surface of the rail.

The beam may be used as a balance with means to balance it located at its mid-point. Two means of providing a pivot point are illustrated. The first is when a solid point or two solid points extend from the lower surface of the beam at its mid-points. These solid points rest on an elevated pedestal. The combination of pedestal and solid points resting on the flat upper surface of the pedestal provides a central pivot point. The second means of providing a pivot point is when a string is threaded through a small hole centrally located on the beam. The string is knotted below the beam so that the knot will support the weight of the beam, and weights on top of the beam. The string can be hand held or supported by a framework. The point where the string enters the beam provides the pivot point.

When used as a balance beam, the scale with "0" in the center of the beam is used. The units are then placed so that a lip on the lower edge of the unit is exactly over the number to be indicated. The lip is midway between the right side and left side of the units. The units can also be stacked one on top of another. When the moments (or vectors) of the left arm (negative side) equal the moments (or vectors) of the right side the beam should be in a balanced position. (Moment is used in its mechanical sense meaning a tendency to produce motion about a point or axis). When several units are used on one arm, the individual moments produced by each of the units can be summed to produce the total moment of that arm. The total moment of the other arm can be computed in the same manner. This arrangement allows the student to concretely manipulate numerical data, and thus to gain insight into such mathematical processes as addition, subtraction, manipulation and division of whole number and fractions.

Two kinds of units for placement on the upper surface of the rail or beam have been described. Both types of units are of the same length. Their length is equal to one increment of measure on the scale illustrated on the beam. Both types of units have a lip extending from centre of the lower edge of the unit. One type of unit has a notch in its mid upper surface, and a wedge protruding from its mid lower surface. These wedges and notches allow for stacking, and stability after the units have been stacked. The wedges on the mid lower surface allow for accurate alignment in notches on the upper ridge of the beam. The notches also prevent the units from sliding back and forth on the beam as it tilts from side to side when it is unbalanced.

The other type of unit is unnotched and is without a wedge on its under surface. It can slide freely back and forth on the ridge of the beam. This type of unit serves best when the beam is being used for its number line functions. Fractional units of notched and unnotched typed can further familiarize the student with addition, subtraction, multiplication and division of fractions.

Other variations of the inventions are illustrated in FIGS. 17 to 21. In FIG. 17 the beam 46 is of rectangular cross-section. The face of the beam shown in this Figure has a series of numbers from 0 to 24 on it, the other parallel face having a number line of −12 to +12. The units 47 are constructed so that they overlap both faces of the beam. They can slide along the beam and can be stacked on top of each other. The beam 46 has a pivot point aperture 48 for a horizontal rod to pass through this beam, and each of the beams described below may be smooth or notched and the units may also be either smooth or have wedges to line up with the notches as shown.

In FIG. 18 the arrangement is similar but the beam 49 is trapezoidal in cross-section. The units are similar to those shown in FIG. 17 but are also trapezoidal in cross-section.

In FIG. 19 is shown a rectangular section beam 50 which takes similar units.

Figure 20:
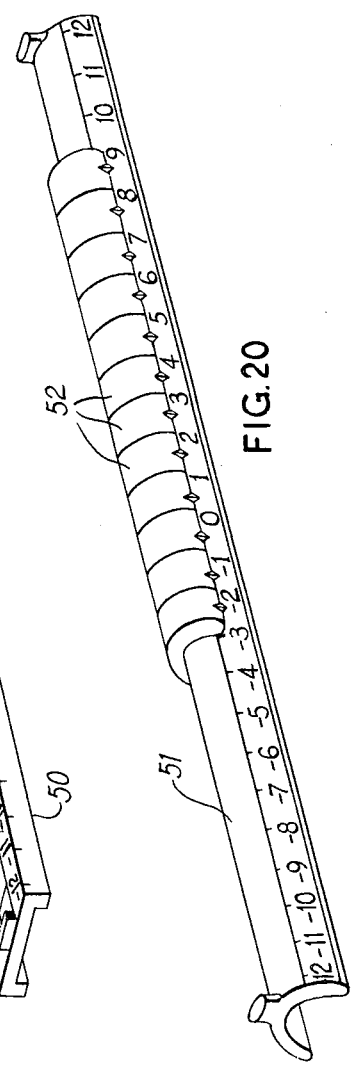
FIG. 20 is an isometric view of a curved beam.
Figure 21:
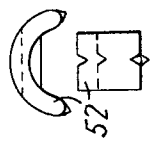
FIG. 21 is a cross-section through one of the units for use with this beam (FIG. 20).

In FIG. 20 is shown a semi-circular section beam 51 which is an example of many possible curved section beams. As shown in FIG. 21 the units 52 for use with this beam are curved so that they can be stacked.

Each of these beams has a number line −12 to +12 in the face which is not shown.

I claim:

1. A mathematical teaching aid comprising:
an elongated beam member having a longitudinally extending upper surface presenting the top thereof,
said member being provided with a series of equally longitudinally spaced marks thereon and associated numbers adjacent the marks, the numbers progressing from 0 at one end to n at the other end of the member; and
a plurality of units overlying said surface and being slidable longitudinally therealong and freely removable from said surface by grasping and lifting said units,
each of said units having a pair of opposed, laterally spaced, depending legs and a dimension longitudinally of the member which bears a predetermined mathematical relationship to the space between a pair of adjacent marks,
each unit straddling said member with its legs disposed on opposite sides of the member, and having a bottom presented at least in part by said legs which defines a downwardly facing cavity configured to complementally receive said surface and partially embrace the member to preclude transverse shifting of the unit without interfering with separation of the member and the unit by upward lifting movement of the latter,
each unit being retained on the member solely by gravity and the complemental reception of said surface within said cavity,
each unit being of sufficient height to project above said surface and expose the unit for easy grasping and manipulation.

2. The mathematical teaching aid as claimed in claim 1, wherein said member is further provided with a second series of equally longitudinally spaced marks thereon and associated numbers adjacent the marks, said second series extending parallel to the first mentioned series and the numbers of said second series progressing from 0 at the midpoint of the series to n/2 at one end and −n/2 at the other end of the member.

3. The mathematical teaching aid as claimed in claim 2, wherein said member presents a pair of elongated balance arms extending in opposite directions from a common origin lying in a transverse plane through said mid-point, there being means for supporting said member at said origin for movement to and from a balanced condition.

4. The mathematical teaching aid as claimed in claim 3, wherein said member has notches in said upper surface thereof aligned with said marks, and wherein each of said units is provided with an upper surface having a central notch therein and is further provided with a central retaining projection depending from its bottom receivable within a corresponding notch in said member or the notch in another unit when stacking the units.

5. A mathematical teaching aid comprising:
an elongated beam member having a longitudinally extending upper surface presenting the top thereof,
said member being provided with a series of equally longitudinally spaced marks thereon and associated numbers adjacent the marks, the numbers progressing from 0 at the mid-point of the series to equal absolute values at the respective ends of the member;
a plurality of units overlying said surface and being slidable longitudinally therealong and freely removable from said surface by grasping and lifting said units,
each of said units having a pair of opposed, laterally spaced, depending legs and a dimension longitudinally of the member which bears a predetermined mathematical relationship to the space between a pair of adjacent marks,
each unit straddling said member with its legs disposed on opposite sides of the member, and having a bottom presented at least in part by said legs which defines a downwardly facing cavity configured to complementally receive said surface and partially embrace the member to preclude transverse shifting of the unit without interfering with separation of the member and the unit by upward lifting movement of the latter,
each unit being retained on the member solely by gravity and the complemental reception of said surface within said cavity,
each unit being of sufficient height to project above said surface and expose the unit for easy grasping and manipulation,
said member presenting a pair of elongated balance arms extending in opposite directions from a common origin lying in a transverse plane through said mid-point; and means for supporting said member at said origin for movement to and from a balanced condition.

6. The mathematical teaching aid as claimed in claim 5, wherein said member has notches in said upper surface thereof aligned with said marks, and wherein each of said units is provided with an upper surface having a central notch therein and is further provided with a central retaining projection depending from its bottom receivable within a corresponding notch in said member or the notch in another unit when stacking the units.

* * * * *